C. C. MOORE.
Curtain-Fixtures.

No. 145,359.

Patented Dec. 9, 1873.

UNITED STATES PATENT OFFICE.

CHARLES C. MOORE, OF NEW YORK, N. Y.

IMPROVEMENT IN CURTAIN-FIXTURES.

Specification forming part of Letters Patent No. 145,359, dated December 9, 1873; application filed September 7, 1872.

*To all whom it may concern:*

Figure 1:
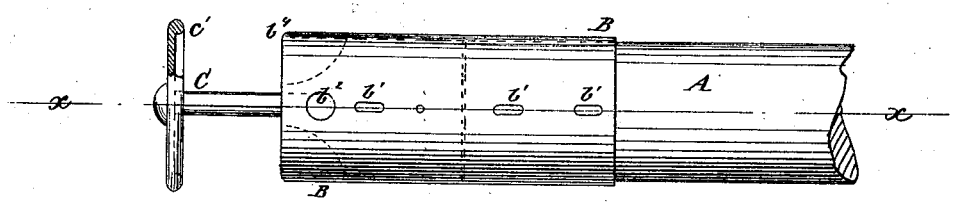
Figure 2:
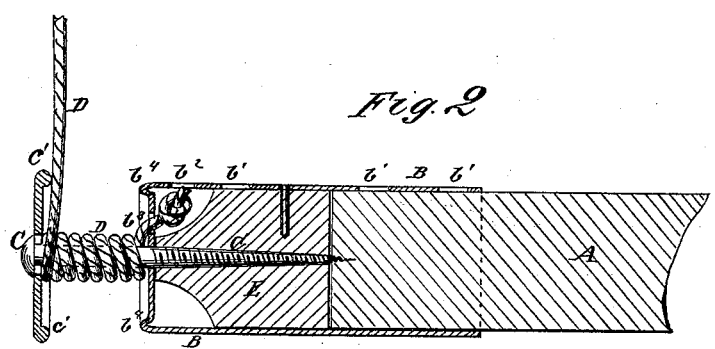

Be it known that I, CHARLES C. MOORE, of the city, county, and State of New York, have invented a new and useful Improvement in Window-Shade Rollers, of which the following is a specification:

Figure 1 is a side view of one end of a shade-roller illustrating my invention. Fig. 2 is a detail longitudinal section of the same taken through the line $x\ x$, Fig. 1.

Similar letters of reference indicate corresponding parts.

My invention has for its especial object to improve the construction of the shade-roller described in Letters Patent No. 75,446, issued to Jacob B. Moore, March 10, 1868, so as to make it more convenient in use and more satisfactory in operation; and it consists in the tubes having holes formed in their sides and ends to receive the cord, and in the flanges or beads formed upon the ends of the tubes and the heads of the screws to serve as guides to the cord, as hereinafter more fully described.

A represents the wooden part or body of the roller, about the construction of which there is nothing new. Upon each end of the roller A is slipped a metallic tube, B, which tubes are made with dies, so as to be exactly of the same size and perfectly true. The tubes B are designed to receive the side parts of the shade, and cause it to roll up true, thus obviating the annoyance in hanging and using shades arising from the rollers not being exactly true. In the sides of the tubes B are formed small holes or slots $b^1$, to receive tacks, which at the same time fasten both the shade and tube to the roller. C is a broad-beaded screw, which is screwed into the ends of the roller A, and which, in connection with the end of the tube B, forms the spool upon which the suspension-cord D is wound.

To cause the shade to operate properly, the screw C must be perfectly true, and must be inserted exactly in the center of the roller. To insure this, a short block, E, with a hole slightly smaller than the shank of the screw C bored through its center, is inserted and secured in the tubes B, before said tubes are placed upon the ends of the roller A. The screws C may terminate in the blocks E, or they may pass entirely through said blocks and enter the ends of the roller A.

By this construction the length of the spool upon which the cord is wound may be adjusted as required by simply turning the screw C in and out. In the side of the tube B, near its outer end, is formed a hole, $b^2$, of such a size as to allow the knot formed upon the end of the cord D to pass through it, and in the end of said tube, toward its center, is formed a hole, $b^3$, of such a size as not to allow the knot upon the end of the cord D to pass through it. The outer end of the block E is turned off or recessed to allow the cord D to be conveniently passed through the holes $b^2\ b^3$, and to form a space for the knot of said cord within the end of the tube B. Upon the outer edge of the end of the tube B is formed a flange or bead, $b^4$, projecting outward, and upon the outer edge of the head of the screw C is formed a flange or bead, $c'$, projecting inward, as shown in Figs. 1 and 2. These flanges or beads are designed to bear against the cord D when it comes to either end of the shank of the spool in being wound upon said spool, so that it cannot make more than one coil upon itself at the end of the spool, and to cause it to at once begin to pass back along the spool, thus preventing the cord from forming two or more coils upon itself at the ends of the spool, which coils soon fall down, disarranging the cord, and throwing the shade out of true.

Having thus described my invention, I claim as new and desire to secure by Letters Patent—

1. The sheet-metal tubes B, having blocks E secured therein, and axially perforated, in combination with the screw C, as and for the purpose specified.

2. The tubes B having holes $b^2\ b^3$ formed in their sides and ends, respectively, to adapt them to receive the cord D, as and for the purpose specified.

3. In combination with the cord D, the flanges or bead $b^4$ and $c'$ formed upon the end of the tube B and the head of the screw C, substantially as herein shown and described, to serve as guides to the cord D, as and for the purpose set forth.

CHARLES CARROLL MOORE.

Witnesses:
JAMES T. GRAHAM,
T. B. MOSHER.